United States Patent
Mayr et al.

(10) Patent No.: US 6,402,122 B2
(45) Date of Patent: Jun. 11, 2002

(54) METHOD FOR DRAWING CABLES INTO CABLE CHANNELS OR PIPES

(75) Inventors: Ernst Mayr, Starnberg; Guenter Einsle, Munich, both of (DE)

(73) Assignee: SCC Special Communication Cables GmbH & Co., KG, Munich (DE)

( * ) Notice: Subject to any disclaimer, the term of this patent is extended or adjusted under 35 U.S.C. 154(b) by 0 days.

(21) Appl. No.: 09/776,587

(22) Filed: Feb. 2, 2001

(30) Foreign Application Priority Data

Feb. 4, 2000 (DE) .......................................... 100 04 992

(51) Int. Cl.7 .............................................. B65H 59/00
(52) U.S. Cl. ........................ 254/134.3 FT; 254/134.4; 29/819; 29/433; 29/241
(58) Field of Search ................................ 254/134.3 FT, 254/134.4, 134.3 R, 134.5; 385/100, 103, 134; 29/728, 819, 433, 241

(56) References Cited

FOREIGN PATENT DOCUMENTS

| DE | 32 38 054 A1 | 4/1984 |
| DE | 34 18 100 A1 | 11/1985 |
| DE | 87 04 035 U1 | 6/1987 |
| DE | 87 09 907 U1 | 10/1987 |
| EP | 0 137 880 A2 | 4/1985 |
| GB | 2 089 008 A | 6/1982 |
| WO | WO 97/03376 A1 | 1/1997 |

*Primary Examiner*—Joseph J. Hail, III
*Assistant Examiner*—Daniel Shanley

(57) ABSTRACT

A method for drawing a cable which inherently lacks tensile strength into cable channels or cable pipes includes providing a tensile yarn skin on the end of the cable before the step of drawing the cable into the channels or pipes. The yarn skin can either be a net hose or a spin-wrap applied onto the cable. One application of the method is the connection of the cable incoming at a terminal tower to a switching center or exchange.

13 Claims, 2 Drawing Sheets

METHOD FOR DRAWING CABLES INTO CABLE CHANNELS OR PIPES

BACKGROUND OF THE INVENTION

The present invention is directed to a method for drawing cables which inherently do not have tensile strength, particularly light waveguide cables, into cable channels or cable pipes. The invention is also directed to the application of this method for connecting a cable at a terminal tower to an exchange via an overhead line.

Dependent on the conditions of stress to which the cables are subjected in the field, light waveguide cables and electrical cables as well are either an armored and/or tensile cable or a lightly built cable having a low tensile strength. The cables with low tensile strength are employed when the cables can be combined and used with another cable, for example a carrying cable.

Armored and/or tensile cables have the required tensile strength, so that they can be drawn into cable channels or pipes. One application of such a cable is the connection of a light waveguide cable incoming at a terminal tower of an overhead line to an exchange arranged at the terminal tower. The cable is thereby usually pulled through the cable channels or pipes, so that it must have a tensile strength that is adequate for this assembly purpose.

One example of light waveguide cables or LWG cables which do not have tensile strength in and of themselves is what is referred to as an LWG shackle cable. An LWG shackle cable usually is about 5 mm thick and is an all dielectric-like waveguide cable or AD-LWG cable that can be shackled to a guard wire or phase wire of an overhead line by a shackle band. The shackle band is wrapped around both the guard wire as well as around the light waveguide cable. Obviously, the light waveguide cable does not require any particular tensile strength for this application.

In practice, however, there are cases wherein one can manage with a lightly constructed, unarmored cable over by far the greater part of a distance that must be bridged by the cable. The cable that has an adequate tensile strength is needed on short intermediate or final paths. In these instances, the cables were previously cut off and a tensile cable was attached with the assistance of a fitting. After bridging the distance that required the tensile cable, a switch was made back to the inherently non-tensile strength cable via fitting. This is more economical than using an armored or tensile cable for the entire length of the cable, because of the lighter structure.

An example of such a situation is the connection of an AD-LWG cable that arrives at a terminal tower of an overhead line and is connected to an exchange. Up to now, the cable ends of the AD-LWG cable were guided into a fitting at a terminal tower, and an armored and/or tensile cable leads into the exchange therefrom, whereby the length of this connection usually amounts to between 10 m to 300 m. Specific, expensive, short cable lengths must then be fabricated for this connection between terminal tower and exchange, and this is expensive and involved because it is always only short pieces that can or must be produced. On the other hand, the lack of tensile strength on the part of the AD-LWG cable does not allow this cable to be drawn directly through cable channels or pipes from the terminal tower up to the exchange.

SUMMARY OF THE INVENTION

The invention is based on the object of offering a method for drawing cables which do not have tensile strength in and of themselves into cable channels or cable pipes and an application of this method to the connection between terminal towers and exchanges that makes the fabrication of specific, expensive, short lengths of armored cable for short distance connections of this type unnecessary.

To accomplish this object, the method is directed to providing a tensile yarn skin to an end of the cable, and then drawing the end of the cable having the tensile yarn skin into a cable channel or cable pipe. The connecting cable incoming at a terminal tower to a switching center can be connected to a cable having the yarn skin, which is applied for the distance that is necessary for being pulled through the various channels or cable pipes.

In accordance with the present invention, a method for drawing cables that inherently have no tensile strength, particularly LWG cables, into cable channels or cable pipes is characterized in that the cable is provided with a tensile yarn skin before being drawn into the pipe or channel. The cable that is unsuitable for higher drawing forces is strengthened by applying the tensile yarn skin so that the cable can be pulled through cable channels or cable pipes from the terminal tower without having to employ special cables for this purpose. It has been shown that a simple tensile yarn skin suffices for this specific purpose, which is the pulling of the cable through a cable channel or a cable pipe over a short distance for a single time.

An advantageous development of the invention is that the tensile yarn skin is applied at the assembly location. It becomes possible to strengthen the incoming cable and introduce it into the cable channel or pipe without interruption and interposition of a fitting.

An advantageous development of the invention is that the net hose is pulled onto the cable as the tensile yarn skin. This yarn skin can be advantageously implemented by a simple mechanism without rotating parts, whereby the supply of the net hose in the mechanism is adequate for the short lengths that are planned.

Another advantageous development of the invention is that an annular receptacle device is employed for a net hose supply. The cable is pulled through the receptacle device and the net hose is thereby taken down from the receptacle device and pulled onto the cable. The cable can, thus, be strengthened in a simple way, and it is advantageously possible to always keep the required supply of net hose on hand for the cable lengths to be fabricated.

Another advantageous development of the invention is that a yarn is spun around the cable as a tensile yarn skin. By applying spinning technology, it is advantageously no longer necessary to set the supply of material for the yarn skin to the cable length to be strengthened, since the spin-wrap can be ended at any time.

Another advantageous development of the invention is that a known yarn spinner or yarn twister is employed for the spin-wrapping of the cable. This is a proven technology that meets the task envisioned here.

Another advantageous development of the invention is that the net hose or, respectively, spin-wrap is fixed by a tensile cable cap at the end of the cable. What is thereby advantageously achieved is that the yarn skin fulfills its purpose when the cable is drawn in and does not slip off from the cable.

Another advantageous development of the invention is that a fiber selected from Kevlar fibers and glass fibers are employed as the yarn skin. It is thereby advantageously a matter of fibers that produce the desired tensile strength without further ado.

The solution of the task also comprises the application of the above-characterized method for connecting a cable incoming at a terminal tower to a switching center or exchange. Here, the yarn skin is applied on this distance between the tower and center. This application is especially advantageous insofar as expensive, short lengths of armored and/or tensile cable have had to be previously employed in this application.

Another advantageous development of the above-mentioned method is that the cable is conducted down from the terminal tower, strengthened and pulled in without interruption or use of any fitting. This solution is advantageous when the distance between the terminal tower and the exchange is comparatively short, so that the cable coming from the terminal tower can be laid in a ring, strengthened and then drawn into the exchange.

Another advantageous development of the above-mentioned application is that the cable incoming at the terminal tower is guided into a fitting and connected to a cable of the same type that is reinforced with the tensile yarn skin and is kept on hand on a cable drum. The connection in the fitting occurs after the reinforced cable is drawn into the cable channel or cable pipe. This solution is advantageous when the distance between the terminal tower and the exchange is greater because practically any arbitrary length for the reinforced cable is then available on the cable drum for the connection between the terminal tower and the exchange. The subsequent connection of the strengthened cable with the fitting at the terminal tower is advantageous because the short length net hose need not be unwound in advance in this case before it is drawn into the cable channel or pipe.

Finally, another advantageous development of the invention is characterized in that the light waveguide shackle cable is employed as the cable. When laying such a cable, the inventive method is especially advantageous with respect to handling and cost savings.

Other advantages and features of the invention will be readily apparent from the following description of the preferred embodiments, the drawings and claims.

DESCRIPTION OF THE PREFERRED EMBODIMENTS

Figure 1:
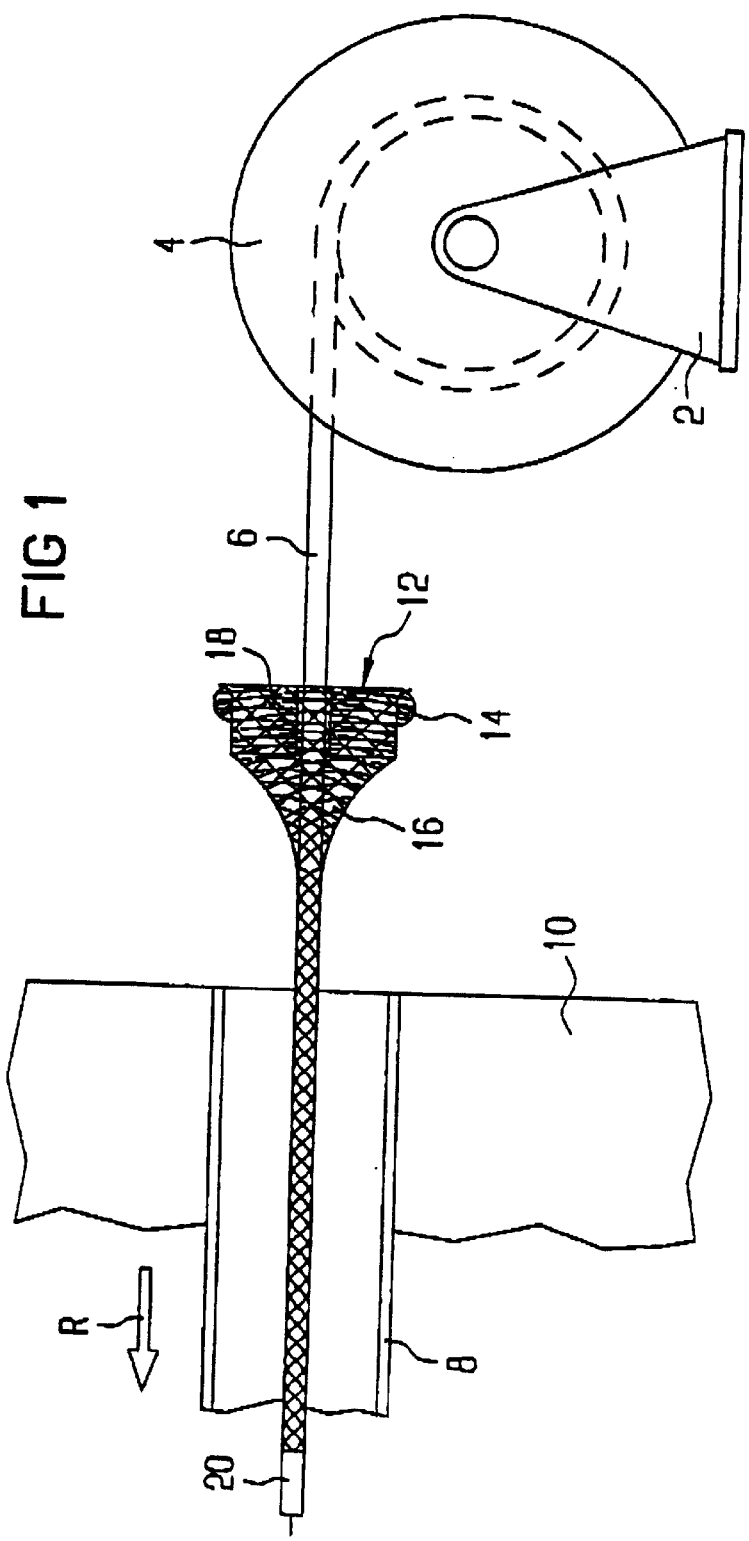
FIG. 1 is a first exemplary embodiment of a mechanism for placing a tensile yarn skin on a cable to strengthen the cable.

The principles of the present invention are particularly useful when incorporated in an arrangement illustrated in FIG. 1, which comprises a cable drum 4 rotatably seated on a rack 2 on which a light waveguide cable 6 is wound. The cable 6 may be an all dielectric light waveguide cable, which is known as an AD-LWG cable. The light waveguide cable 6 is now to be drawn into a cable channel 8, which lies in a cable shaft 10 with the direction of drawing being indicated by the arrow R. To this end, a receptacle device 12, on which a supply 14 of tensile yarn hose 16 is stored, is provided between the cable drum 4 and the cable channel 8. The receptacle device 12 is annularly fashioned and divisible, so that the receptacle device can be removed in a simple way after the end of the strengthening of the cable.

For drawing the cable 6 into the cable channel 8, the end of the cable is first inserted through a central opening 18 of the receptacle device 12, and the end of the cable 6 and the yarn hose 16 are then connected to one another by a cable cap 20 and the cable with the yarn hose 16 is then drawn into the channel 8.

Figure 2:
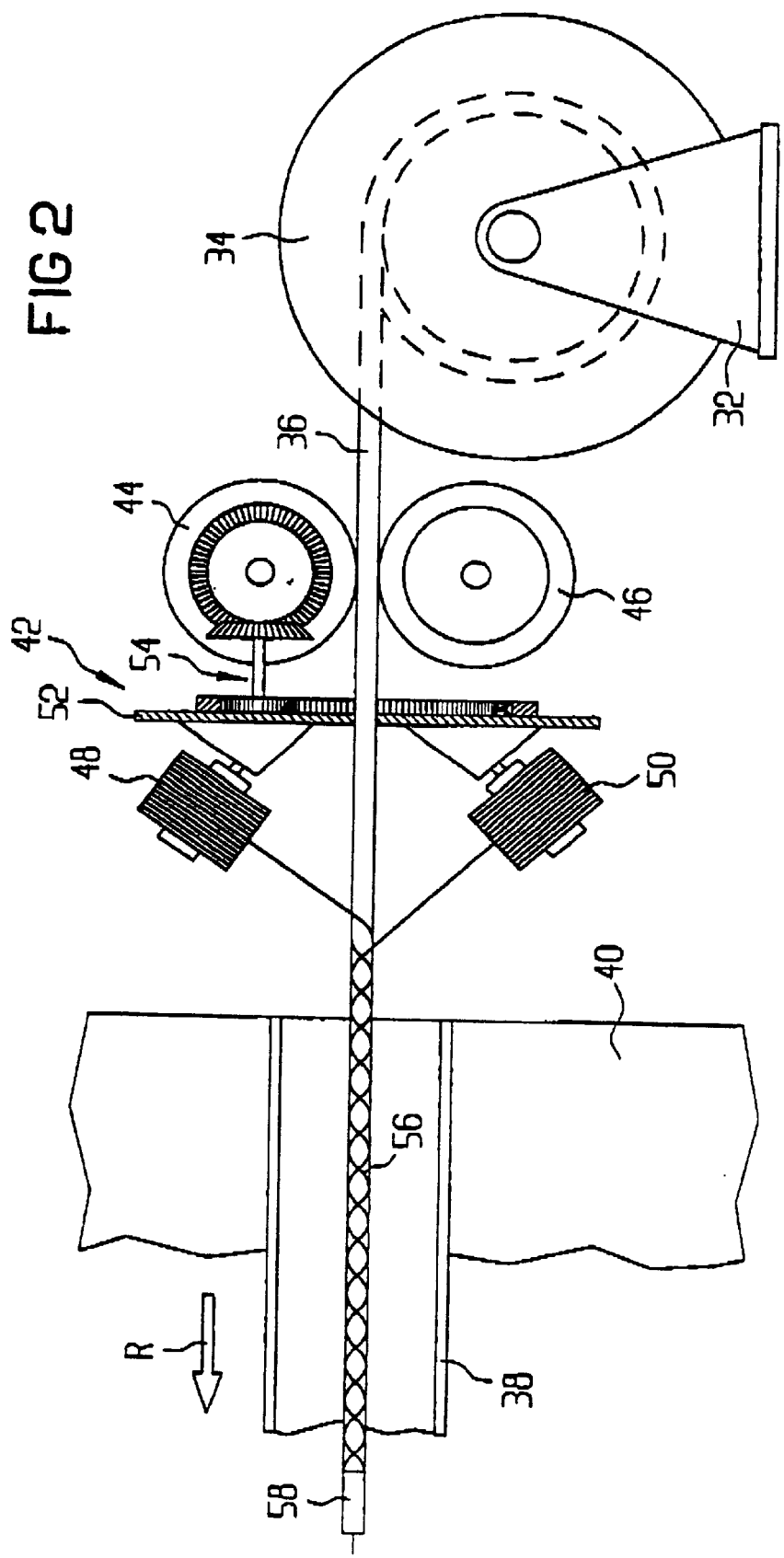
FIG. 2 is a second embodiment for forming a tensile yarn skin on a cable and, thus, strengthening the cable.

In an arrangement according to FIG. 2, a cable drum 34 is rotatably mounted on a rack 32 on which the light waveguide cable 36 is wound. The cable 36 is now to be drawn into a cable channel 38 in the direction of the arrow R. To that end, a twister or, respectively, spinner 42, on which a yarn supply is stored, is provided between the cable drum 34 and the cable channel 38.

Given the arrangement of FIG. 2, the cable 36 is conducted through the spinner 42, which includes two pressure rollers 44 and 46 that engage the cable 36 in order to drive the spinner 42. The spinner also supports two yarn spools 48 and 50 that are arranged on a rack 52 and are driven by the pressure rollers 44 and 46 via gears 54 so that they turn around the cable in opposite rotational sense in order to spin around the cable 36. Before the cable 36 is drawn in, a spin-wrap 56 is connected to the cable with a cable cap 58.

In the two embodiments, a respective cable was employed. Applications are involved wherein the cable length to be strengthened is comparatively great. When the cable length is smaller and can be laid down as a ring before being drawn in, the cable drum can be omitted, since the cable coming from the tower can then be drawn into the cable channel without interruption.

In the above specification, the LWG shackle cables were particularly referred to. The invention, however, is not limited to this cable type, but, for example, can be applied to electrical cables, wherein the strength relationships are similar to those given with LWG cables.

Although various minor modifications may be suggested by those versed in the art, it should be understood that we wish to embody within the scope of the patent granted hereon all such modifications as reasonably and properly come within the scope of our contribution to the art.

We claim:

1. A method for drawing inherently non-tensile strength cables into a cable channel or cable pipe, said method comprising the steps of providing a tensile yarn skin on a portion of the cable, and then drawing the portion of the cable with the tensile yarn skin into the cable channel or cable pipe, wherein providing the tensile yarn skin comprises providing the tensile yarn skin to a length of the cable sufficient to extend at least through the cable channel or cable pipe.

2. A method according to claim 1, wherein the yarn skin is applied at the assembly location.

3. A method according to claim 1, wherein the step of providing the tensile yarn skin pulls a net hose onto the cable.

4. A method according to claim 3, which includes providing an annular receptacle for a net hose supply, extending the cable through the receptacle device and drawing the net hose off of the receptacle device onto the cable.

5. A method according to claim 3, which includes fixing the net hose onto the end of the cable with a tensile cable cap.

6. A method according to claim 1, wherein the step of providing the tensile yarn skin includes spin-wrapping the yarn around the cable.

7. A method according to claim 6, wherein the spin-wrapping of the cable utilizes a known device selected from a yarn spinner and a yarn twister.

8. A method according to claim 6, which includes fixing the tensile yarn skin to the end of the cable with a tensile cable cap.

9. A method according to claim 1, wherein the step of providing a yarn skin provides a yarn skin formed of fibers selected from Kevlar and glass fibers.

10. A method for drawing inherently non-tensile strength cables into a cable channel or cable pipe, said method comprising the steps of providing a tensile yarn skin on an end of the cable including applying the tensile yarn skin to a length of cable extending from a terminal tower to a switching center, and then drawing the end of the cable with the tensile yarn skin into the cable channel or cable pipe.

11. A method according to claim 10, wherein the cable is conducted down from the terminal tower, has the yarn skin applied thereto and is then drawn into the channel or pipe without interruption and a fitting.

12. A method according to claim 10, wherein the cable incoming at the terminal tower is guided into a fitting and is connected to a cable of the same type that is kept on hand on a cable drum and has been reinforced with a tensile yarn skin, the connection in the fitting occurs after the reinforced cable is drawn into the cable channel or cable pipe.

13. A method according to claim 1, wherein the cable is a light waveguide shackle cable and the step of providing the tensile yarn skin applies the skin to the end of the light waveguide shackle cable.

* * * * *